UNITED STATES PATENT OFFICE.

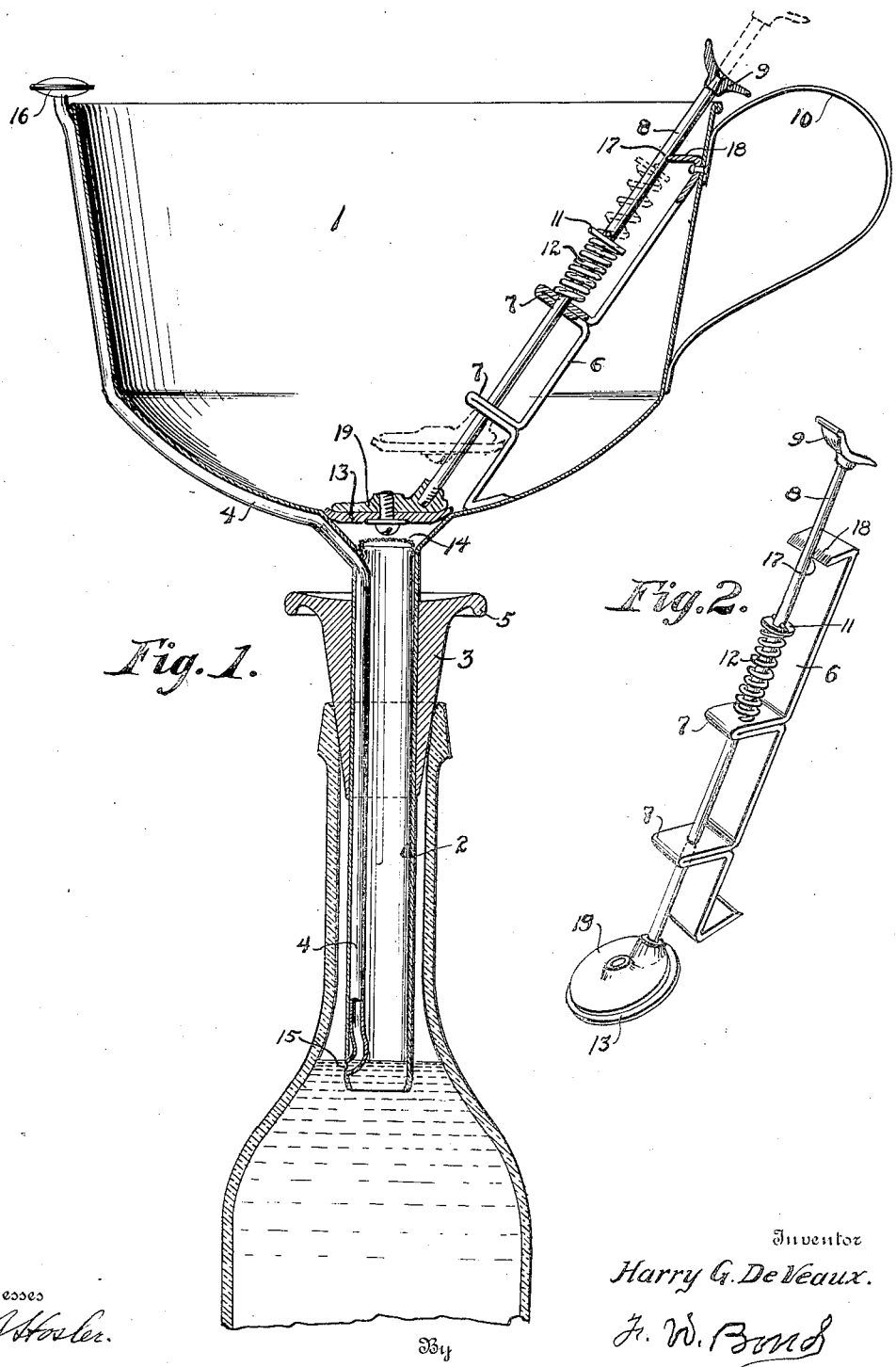

HARRY G. DE VEAUX, OF ROBERTSVILLE, OHIO.

FUNNEL.

No. 843,873.  Specification of Letters Patent.  Patented Feb. 12, 1907.

Application filed March 31, 1906. Serial No. 309,153.

*To all whom it may concern:*

Be it known that I, HARRY G. DE VEAUX, a citizen of the United States, residing at Robertsville, in the county of Stark and State of Ohio, have invented certain new and useful Improvements in Funnels; and I do hereby declare that the following is a full, clear, and exact description of the same, reference being had to the annexed drawings, making a part of this specification, and to the numerals and figures of reference marked thereon, in which—

Figure 1 is a vertical section showing the funnel closed. Fig. 2 is a view showing the valve and its different parts detached from the funnel.

The present invention has relation to funnels designed to be employed in filling bottles and other receptacles wherein the liquid is to be brought to a predetermined height within the receptacle; and it consists in the several parts and combination of parts hereinafter described, and particularly pointed out in the claim.

Similar numerals of reference indicate corresponding parts in all the figures of the drawings.

In the accompanying drawings, 1 represents the funnel-bowl, which may be of any desired form such as is commonly employed in funnels. To the bowl 1 is attached or formed integral therewith the spout 2, which spout is of course for the purpose of being entered into the neck of a bottle or the filling-aperture of any receptacle. Upon the spout 2 is located the tapered air-excluding sleeve 3, which sleeve is preferably formed of rubber or other non-porous and yielding material and is for the purpose of cutting off the escape of air except through the air-tube 4 during the time the vessel is being filled. The object of forming the sleeve 3 tapering is to fit and close various-sized filling-apertures and to cut off the escape of air. If the sleeve does not closely fit the filling-aperture at any desired point between its ends, the top or upper end of said sleeve is provided with the grooved flange 5, which grooved flange is for the purpose of fitting upon the top or rib of the filling-aperture. The sleeve is adapted to slide up and down upon the spout 2, and is so formed that it will be held at the desired point of adjustment by means of friction between said sleeve and the filling-spout 2.

To the funnel-body 1 is attached the bar 6, which bar is secured at its top and bottom ends by means of rivets or their equivalents, which bar is provided with the guide-flanges 7, said guide-flanges being for the purpose of holding the rod 8, which rod is provided with the push-knob 9 at its top or upper end, which push-knob is located near the handle 10, as illustrated in Fig. 1. The rod 8 is provided with the fixed flange 11, and between said fixed flange and the upper guide-flange 7 is located the spring 12, which spring is for the purpose of normally holding the valve 13 up, as illustrated in dotted lines, Fig. 1, so as to allow the liquid to pass from the funnel-body into the spout 2. Within the spout 2 is located the air-tube 4, which air-tube is open at its bottom or lower end and communicates with the opening or air-passage 15, formed in the bottom or lower portion of the spout 2. The air-tube 4 extends upward along the outer surface of the funnel bowl or body 1, and its top or upper end is provided with the whistle 16.

In use the valve 13 is placed in its open position, and as the liquid passes through the spout 2 and into the receptacle the air contained in the receptacle is displaced; but the air will pass out through the air-tube 4 and blow the whistle 16 until the liquid-line comes above the aperture 15 at the time the air is cut off, and of course the whistle ceases to blow, thereby giving notice that the liquid has reached the air-aperture, after which the valve 13 is pushed down and closed, cutting off the flow of liquid, and for the purpose of holding the valve 13 in its closed position the rod 8 is provided with the notch 17, which notch is for the purpose of holding the rod down by means of the catch 18. After the valve 13 has been closed the funnel can be removed from the receptacle and the liquid contained in the funnel bowl and spout removed and the funnel proper placed in another receptacle. Should there be liquid in the spout below the valve 13, it will be atmospherically held, owing to the fact that the valve 13 cuts off the flow of liquid and at the same time cuts off the atmospheric pressure above the valve, so that the atmospheric pressure below the valve will prevent the flow of liquid, although the spout is open at its lower or bottom end.

For the purpose of assisting in preventing the flow of liquid the bottom or lower end of the spout 2 is bent inward somewhat, so as to better cut off the flow of liquid, or, in other words, to prevent dripping.

It will be understood that when it is desired to release the rod 8 it can be sprung inward at its top end, thereby releasing the catch 18 from the notch 17, at which time the spring 12 will automatically elevate the valve 13.

For the purpose of providing a means for removing the valve 13 from the rod said valve is provided with the block 19, which block is provided with a screw-threaded aperture and the rod 8 screw-threaded, so that by rotating the rod it can be connected to the valve proper.

When the liquid has reached a level above the air-passage 15, the escape of air will be cut off, and by reason thereof the liquid will cease to flow, after which the funnel proper can be removed after the valve 13 has been seated, providing any liquid remains in the funnel-bowl. For the purpose of straining the liquid as it passes from the funnel-bowl into the receptacle the strainer 14 is provided, which is located substantially as shown in the drawings.

Having fully described my invention, what I claim as new, and desire to secure by Letters Patent, is—

In a funnel of the class described, the combination of a bowl and a spout therefor, an air-tube extended from the top of the bowl downward and into the spout, said air-tube provided at its bottom or lower end with an air-passage, a tapered sleeve located upon the spout and provided at its top or upper end with a grooved flange, a valve adapted to close the spout of the funnel, a bar secured to the bowl, said bar provided with flanges and a valve-operating rod passing through apertures in said flanges and guided thereby, said rod provided with a notch, a catch adapted to engage said notch and means for holding the valve in elevated position, substantially as and for the purpose specified.

In testimony that I claim the above I have hereunto subscribed my name in the presence of two witnesses.

HARRY G. DE VEAUX.

Witnesses:
    B. B. BOWMAN,
    WILLIAM A. BOWMAN.